United States Patent [19]

Newman et al.

[11] 3,754,966
[45] Aug. 28, 1973

[54] TRANSFER ELEMENTS AND PROCESSES
[75] Inventors: Douglas A. Newman, Glen Cove; Alfred M. Vogel, Malverne; Allan T. Schlotzhauer, Glen Cove, all of N.Y.
[73] Assignee: Columbia Ribbon and Carbon Manufacturing Co., Inc., Glen Cove, N.Y.
[22] Filed: Oct. 22, 1970
[21] Appl. No.: 82,969

Related U.S. Application Data
[63] Continuation-in-part of Ser. No. 692,113, Dec. 20, 1967, abandoned.

[52] U.S. Cl...... 117/36.1, 117/93.31, 117/138.8 E, 117/155 UA, 260/41 C
[51] Int. Cl.............................................. B41m 5/10
[58] Field of Search.......................... 117/36.1, 93.31

[56] References Cited
UNITED STATES PATENTS
3,342,622  9/1967  Crocker............................ 117/36.1
3,013,895  12/1961  Agruss............................ 117/93.31

FOREIGN PATENTS OR APPLICATIONS
907,688  10/1962  Great Britain................... 117/93.31
1,136,354  9/1962  Germany........................ 117/36.1

Primary Examiner—Murray Katz
Attorney—Johnson & Kline

[57] ABSTRACT

Process for making novel pressure-sensitive carbons and ribbons having a resinous binder material comprising preparing a liquid composition containing a liquid polymerizable polyvinyl ester of a polyhydric alcohol, a non-volatile, non-drying oleaginous material and an imaging material, coating the liquid composition as a thin layer on a support and subjecting the thin layer to a uniform application of high intensity electron radiation for a brief period of time to cause the resin precursor to polymerize and form a thin, dry, pressure-sensitive resinous ink layer.

8 Claims, 2 Drawing Figures

Patented Aug. 28, 1973

3,754,966

INVENTORS
Douglas A. Newman
Alfred M. Vogel
Allan T. Schlotzhauer
BY Johnson and Kline
ATTORNEYS

TRANSFER ELEMENTS AND PROCESSES

This application is a continuation-in-part of U.S. parent application Ser. No. 692,113, filed Dec. 20, 1967, now abandoned.

The present invention is primarily concerned with the production of improved pressure-sensitive transfer elements such as carbon papers and typewriter ribbons which comprise either a non-transferable microporous resinous structure containing pressure-exudable ink within the pores thereof, as illustrated generally by U.S. Pat. Nos. 2,944,037; 2,984,582 and 3,037,879, among others, or a pressure-transferable, frangible, resinous structure containing resin-miscible oils and coloring matter, as exemplified by U.S. Pat. Nos. 3,177,086; 3,274,928 and 3,169,880, among others.

While such resinous transfer elements are currently used with much success in the carbon and ribbon field, they do present certain difficulties and disadvantages because of the necessity of applying the resinous ink composition in the form of a solution in a major amount of a volatile organic solvent. The use of large amounts of such solvents is dangerous because of their volatility and is expensive because of their loss into the atmosphere and also because of the necessity of long drying tunnels and air circulation equipment. The use of such large amounts of solvent is also disadvantageous because a residual amount of solvent always remains in the final transfer element and leads to lack of uniformity of performance, curling tendency and other undesirable properties.

It has been suggested to produce squeeze-out type transfer elements in the absence of volatile solvents through the use of resin dispersions in oily materials which function as plasticizers or solvents at elevated temperatures. However such a process has proved to be impractical due to the lack of uniformity of the resin dispersions used and the inability to consistently obtain uniform ink-releasing layers in this manner.

It has also been suggested that carbon papers and ribbons of the squeeze-out type can be prepared in the absence of volatile organic solvents by using the liquid monomeric components of the resinous binder material together with the incompatible ink and a catalyst, coating the composition on a foundation and applying heat to cause the monomers to polymerize and form the solidified binder material. This process is not in commercial use since it is necessary to conduct such catalyzed polymerizations in a closed atmosphere and under elevated pressures and such a process is too slow for commercial use since it requires a long period of heating to accomplish complete polymerization.

It is the principal object of the present invention to provide a rapid method for producing pressure-sensitive resinous transfer elements under ambient conditions and in the absence of major amounts of volatile organic solvents.

It is another object of this invention to provide a rapid method for producing such transfer elements using liquid resin precursors in such a manner as to provide consistently uniform ink-releasing transfer elements.

It is an object of one embodiment of this invention to provide resinous transfer elements which are completely free of residual or trace amounts of volatile organic solvents and which are therefore uniform and devoid of curling tendencies.

It is yet another object to produce self-supporting microporous resinous ink-releasing transfer elements which are stronger and more cut-resistant than similar elements prepared from volatile solvent solutions.

These and other objects and advantages of the present invention will be clear to those skilled in the art in the light of the present disclosure, including the drawing, in which:

FIG. 1 is a side view of the polymerization apparatus used in the process of the present invention; and FIG. 2 is a diagrammatic cross-section, to an enlarged scale, of an ink-releasing transfer element prepared according to one embodiment of the present invention.

The objects and advantages of the present invention are accomplished by our discovery that it is possible to produce resinous transfer elements in the absence of volatile solvents and in an exceptionally rapid and reliable manner at atmospheric pressure and in the absence of applied heat by means of specially formulated polymerizable ink compositions and the step of radiation curing, using high energy electrons to cause rapid intermolecular crosslinking of the resin-forming components and produce a solid, tough, resin structure of either the squeeze-out type or the frangible type depending on the formulation used.

Aside from the rapidity of the present process, it is also unexpectedly advantageous in that it results in resinous structures which are tougher and stronger than solvent-applied resins and which therefore produce sharper typed images and are more durable and, in the case of squeeze-out elements, may be reused more often than conventional solvent-applied carbons. This additional strength and durability is due to the increased crosslinking and polymerization made possible by electron curing. The strength and durability of solvent-applied resins is limited by the requirement that the resin must have a sufficiently low molecular weight as to be soluble in common volatile organic solvents. The increased durability and strength is important in connection with all carbons and ribbons but is of special importance in connection with self-supporting squeeze-out type carbons and ribbons of the types disclosed in British Pat. Nos. 965,517 and 989,622.

The apparatus used to effect radiation curing of the present products comprises a conventional high energy accelerator such as a Dynamitron, commercially available from Radiation Dynamics, Inc., Westbury, N.Y. As shown in FIG. 1 of the drawing, the accelerator comprises a high voltage power supply in association with an electron source 19 and an acceleration tube 14. High voltage is supplied to an electron source such as a thoriated tungsten filament 10 contained within a head 11 which is insulated within housing 12 such as by an atmosphere of sulfur hexafluoride gas. The energized filament emits a stream of electrons which are focused by a lens 13 such as a Pierce lens and then are accelerated to the required level, generally in the range of from 100 kv to 350 kv in a reentrant beam acceleration tube 14 which is under vacuum. The accelerated electron beam is deflected by magnet 15, similarly to a television tube, and is emitted by a suitable window 16 such as a 1 mil thick titanium alloy window.

As shown in FIG. 1, the foundation sheet or casting surface 20 carrying the liquid coating 21 of resin-formers, oleaginous material and pigment and/or dye is continuously passed beneath the electron-emitting window 16 at any desired speed up to about 500 square feet per minute depending on the thickness of the coatings being cured and the distance between the liquid coating and the electron-emitting window.

Figure 1:
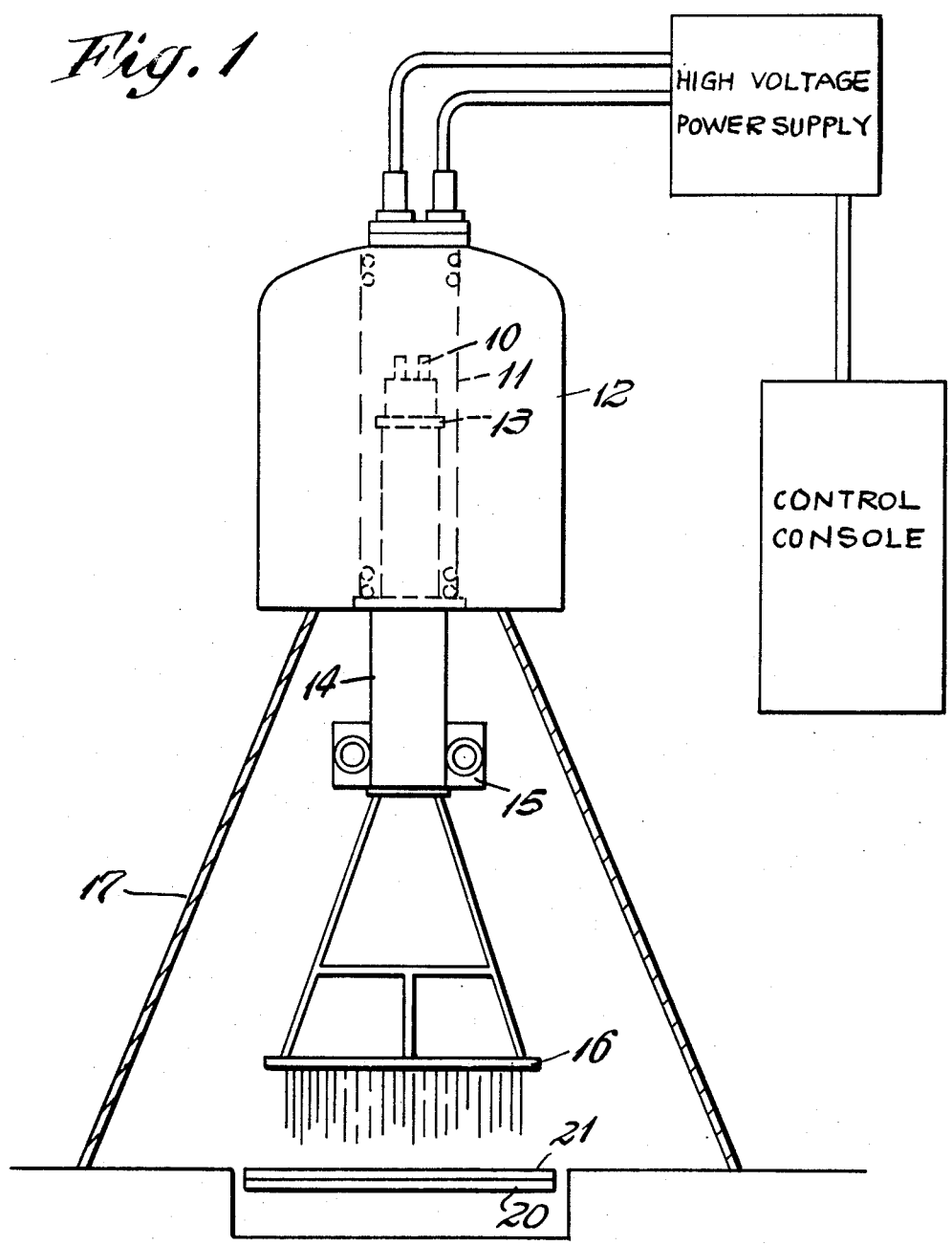
FIG. 1 shows a shield 17 such as lead of one-half inch thickness to protect the worker from radiation exposure. However the control console and workers are preferably located in a separate shielded room to eliminate the dangers of radiation and the apparatus is operated in a continuous automatic manner.
Figure 2:
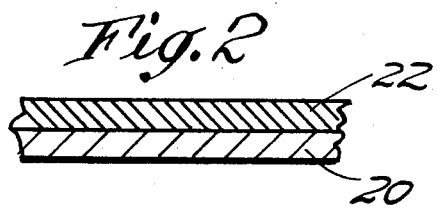
FIG. 2 shows a transfer sheet produced according to one embodiment of this invention in which element 20 is a flexible foundation sheet such as paper or plastic film and functions as a support for the pressure-sensitive resinous layer 22.

The polymerizable compositions of the present invention comprise a liquid polymerizable polyvinyl ester of a polyhydric alcohol as a binder material, an oleaginous non-volatile, non-drying liquid or semi-solid ink vehicle which is compatible with the liquid polymerizable polyvinyl ester binder material and is either compatible or incompatible with the solidified polymerized polyvinyl ester binder material, and solid particulate imaging material such as pigment or dyestuff. Other conventional ingredients may also be present such as fillers, wetting agents, soluble resins and waxes and, if desired, small amounts of volatile solvent.

The polyvinyl esters of polyhydric alcohols suitable for use herein are liquids which contain two or more unsaturated ester groups such as vinyl linkages. While such polyvinyl esters may be used alone or in mixture with other polymerizable vinyl monomers or polymers to form the present resinous binders, it is preferred that they are used together with unsaturated polymers, the polyvinyl ester comprising from 40 to 99 percent by weight of the total resin content.

In the case of mixtures of uncured or non-crosslinked unsaturated normally solid polymers and polymerizable liquid monomeric polyvinyl esters of glycols, the latter function as solvents or vehicles for the polymers in the batch composition and polymerize and crosslink with the unsaturated polymers under the effects of electron activation to form a cured, insoluble and infusible resinous binder material. The presence of the unsaturated polymer in the ink coating composition appears to catalyze the polymerization or cure of the total and substantially reduces the curing time.

The unsaturated polymer comprises from about 1 percent up to about 60 percent by weight of the total weight of the resin-forming mixture. Preferred unsaturated polymers are alkyd resins formed by reacting unsaturated dicarboxylic acids or anhydrides such as maleic, fumaric, and itaconic with polyhydric alcohols such as ethylene glycol, glycerine and sorbitol; low molecular weight acrylic and methacrylic acid and ester polymers such as polymethyl methacrylate and polyacrylic acid; low molecular weight vinyl polymers such as polyvinyl chloride, vinyl chloride-vinyl acetate copolymers, polystyrene; hydrocarbon polymers of low molecular weight such as polyethylene, polypropylene, polybutadiene and butadiene-styrene copolymers. In general, any unsaturated polymer capable of further polymerization may be used provided that it is a liquid or is a solid which is soluble in the liquid monomeric polyvinyl ester present in the composition.

The preferred polyvinyl esters for use according to the present invention are glycol polyacrylates which also include a number of active hydrogen atoms in the molecule, such as diethylene glycol dimethacrylate, propylene glycol diacrylate, tetraethylene glycol dimethacrylate, and the like.

Other resin-forming materials which may be used in place of the unsaturated polymer are the low molecular weight liquid polymers which comprise liquid telomers or liquid compounds containing a small number of linked monomers. Actually most commercially available monomers contain a small amount of such liquid polymers. Also suitable are monomers such as methyl methacrylate, vinyl stearate, divinyl benzene, acrylonitrile, styrene, and the like.

The oleaginous liquid or semi-solid ink vehicle and the pigment or dyestuff are conventional components of the type heretofore used in the solvent-carbon field. Liquid non-drying oily vehicles such as mineral oil, butyl stearate, oleic acid, rapeseed oil and castor oil are preferred, the selection of appropriate oils depending upon the type of transfer element being formed. It is necessary that the oleaginous ingredients be compatible with, i.e., solvents for or soluble in, the liquid resin precursor(s) used.

In general, the resin-forming materials comprise from 30 to 70 percent by weight of the total composition, the oleaginous material comprising from 20 to 50 percent by weight and the imaging material comprising from 10 to 40 percent by weight. The unsaturated polymer, telomer, or monomer, if present, comprises from 1 to 60 percent by weight of the resin-forming mixture, i.e., comprises from 0.3 to 28 percent by weight of the total composition, while the polyvinyl ester comprises from 40 to 100 percent of the resin-forming materials.

The present liquid compositions may be coated onto the support in conventional manner but are particularly well adapted to being printed on because of their consistency and quick curing ability. Thus spot carbons and picture frame carbons having exceptionally sharp straight borders may be printed according to this invention.

The following examples are set out by way of illustration and should not be considered limitative.

EXAMPLE 1

An electron-curable resinous ink composition is formed by mixing the following ingredients to a uniform coatable consistency:

| Ingredients | Parts by Weight |
|---|---|
| Trimethylol propane triacrylate | 20.0 |
| Vinyl stearate monomer | 2.0 |
| Mineral oil | 8.0 |
| Toned carbon black | 2.0 |

The mixture has a thin spreadable consistency due to the large amount of liquid triacrylate monomer. It is applied to a thin foundation web such as paper or plastic film by means of an application roller and spread, if desired, by means of a doctor blade. The thickness of the ink layer is about 1 mil, although it may range from about one-half mil up to about 5 mils depending upon the utility to which the ink layer is to be applied. Ink layers for pencil carbons generally are thicker than ink layers for typewriter carbons and ribbons. Also, self-supporting ink layers which are stripped from the casting surface foundation are generally of the greatest thickness in order to provide increased strength and durability.

After the liquid ink layer 21 is applied to the foundation 20, the coated web is continuously passed beneath the emission window 16 of a high energy electron accelerator as shown in FIG. 1. The accelerator is operated at a voltage of 300,000 volts or 300 kilovolts and the distance between the electron emission window and the polymerizable ink layer equals about 6 inches. The coated web is passed beneath the accelerator at a speed of from about 100 to 320 square feet per minute, depending upon the thickness of the polymerizable layer, to cause polymerization and solidification of the resinous binder material, trapping the oils and pigment as pressure-exudable ink droplets within the resinous honeycomb structure.

The measurement of the energy which is absorbed by the polymerizable coating is expressed in terms of "rads," a "rad" being equal to 100 ergs of energy per gram of coating. A 300 kilovolt accelerator has a 6,000 megarad-pound/hour capability and for the purposes of the present invention is operated at an output of about 2 megarads. In this manner it is possible to process about 3,000 pounds of polymerizable coating per hour. Since the present coatings vary in weight from about 5 to 20 pounds per ream (approximately 3,000 square feet) depending on thickness, and since the coated web has a predetermined width, the required speed of the web beneath the electron emission window can be easily calculated.

The irradiated web is then cut into appropriate sheet lengths and the sheets are found to have better strength and durability, cleanliness to the touch and imaging properties than corresponding transfer sheets produced by conventional solvent-coating techniques.

EXAMPLE 2

The following ingredients are mixed to a uniform coatable consistency and are coated onto a smooth polyethylene film at a thickness of 3 mils:

| Ingredients | Parts by eight |
|---|---|
| Tetraethylene glycol dimethacrylate | 20.0 |
| Unsaturated solid polymer of maleic acid and ethylene glycol | 20.0 |
| Castol oil | 8.0 |
| Oleic acid | 6.0 |
| Clay | 10.0 |
| Toned carbon black | 4.0 |

The coated polyethylene is exposed to high energy electrons in the manner discussed in connection with Example 1 to form a dry cured layer which is frangible or pressure-transferable in a stencilling manner from the film foundation under the effects of imaging pressure.

It should be understood that various polymerizable monomers and mixtures thereof with minor amounts of polymers soluble in or compatible with such monomers may be used according to the present invenion in mixture with the monomeric polyvinyl ester of a polyhydric alcohol, the essential novelty residing in the discovery that monomeric liquid polyvinyl esters of polyhydric alcohols are extremely well adapted to the manufacture of carbon papers by means of electron bombardment. Such monomeric materials polymerize rapidly and completely, through the entire thickness of the ink layer, in spite of the presence of large amounts of non-drying oils, pigments and fillers in the ink layer, and provide solidified resinous binder materials which are tough and stable. The use of non-volatile resin-forming materials is preferred in view of the fact that some heat is generated during the polymerization reaction and therefore some loss of highly volatile monomers will occur. In general, monomers having an evaporation temperature of at least 80° C are preferred.

We have found that small amounts of volatile organic solvents, up to about 10 percent by weight of the total composition, can be included with excellent results. The solvent is miscible with the resin-forming materials and the oleaginous material. The solvent greatly reduces the viscosity of the liquid composition and for some reason greatly reduces the curing time of the resin-forming materials. The relatively small amount of solvent used is far less dangerous and expensive than the major amounts required heretofore.

Variations and modifications may be made within the scope of the claims and portions of the improvements may be used without others.

We claim

1. The process of producing a pressure-sensitive transfer element having a resinous binder material which comprises the steps of:
   a. preparing a composition comprising from 30 to 70% by weight of a liquid polymerizable monomeric glycol polyacrylate containing at least two vinyl ester groups, from 20 to 50 percent by weight of a non-drying oleaginous material which is compatible with the glycol polyacrylate and from 10 to 40 percent by weight of imaging material,
   applying said composition to a support as a thin layer, and
   c. irradiating said thin layer with high energy electrons to cause the glycol polyacrylate to polymerize and form a solid resinous binder material for said oleaginous material and said imaging material to produce a dry pressure-sensitive transfer layer.

2. The process according to claim 1 in which said oleaginous material is a liquid oil which is substantially incompatible with said solid resinous binder material.

3. The process according to claim 1 in which said composition also contains from 1 to 60 percent by weight, based on the total weight of the binder material, of an unsaturated polymer which is soluble in the liquid monomer.

4. The process according to claim 1 in which up to 10 percent by weight of the composition comprises a volatile organic solvent which is miscible with the liquid monomer and the oleaginous material.

5. The process according to claim 1 in which the irradiation step is conducted by exposing the thin layer to a high energy electron accelerator operated at a voltage of between about 100,000 and 350,000 volts.

6. The process according to claim 1 in which the said support is a smooth casting surface from which the dried pressure-sensitive transfer layer is separated as a self-supporting element.

7. The process according to claim 1 in which the dried pressure-sensitive transfer layer has a thickness of from about 0.0005 inch to 0.005 inch.

8. A pressure-sensitive transfer element produced according to the process of claim 1.

* * * * *